Figure 1:
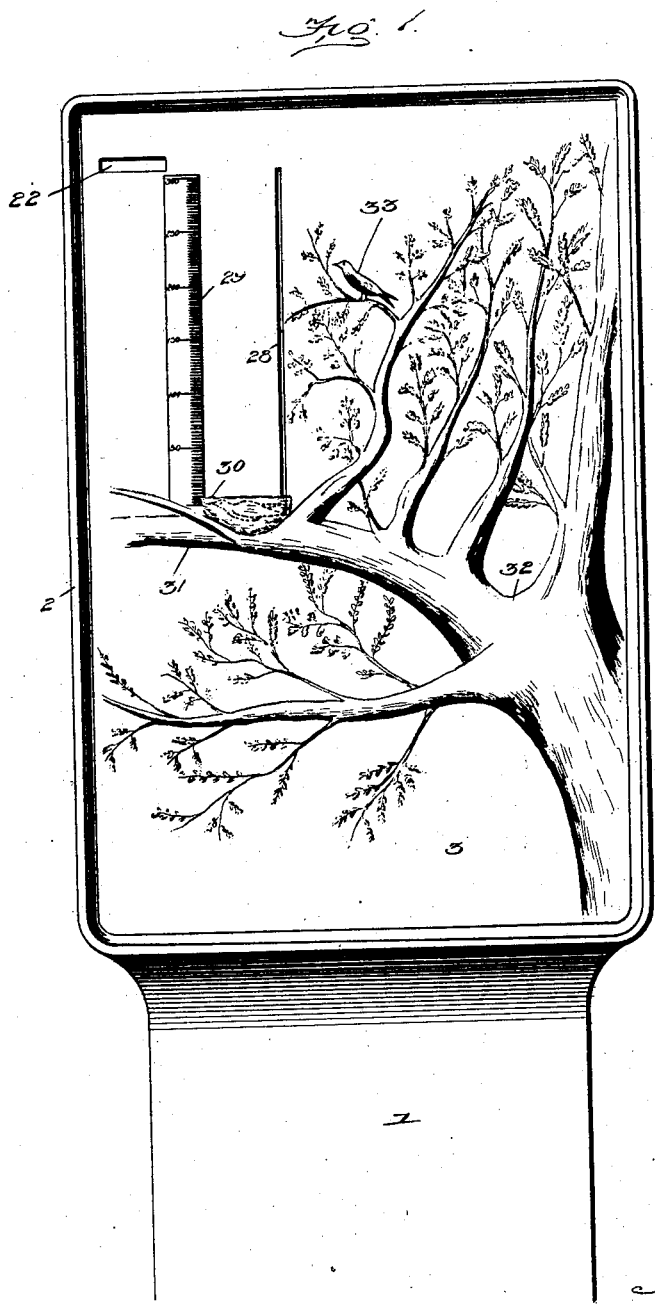

No. 724,364.  
PATENTED MAR. 31, 1903.

J. T. WITEK.  
COIN CONTROLLED WEIGHING MACHINE.  
APPLICATION FILED DEC. 26, 1901.

NO MODEL.  
2 SHEETS—SHEET 1.

Witnesses  
Wm. Koerth  
Chas. S. Hyer

Inventor  
John T. Witek,  
By Victor J. Evans  
Attorney

No. 724,364. PATENTED MAR. 31, 1903.
J. T. WITEK.
COIN CONTROLLED WEIGHING MACHINE.
APPLICATION FILED DEC. 26, 1901.
NO MODEL. 2 SHEETS—SHEET 2.
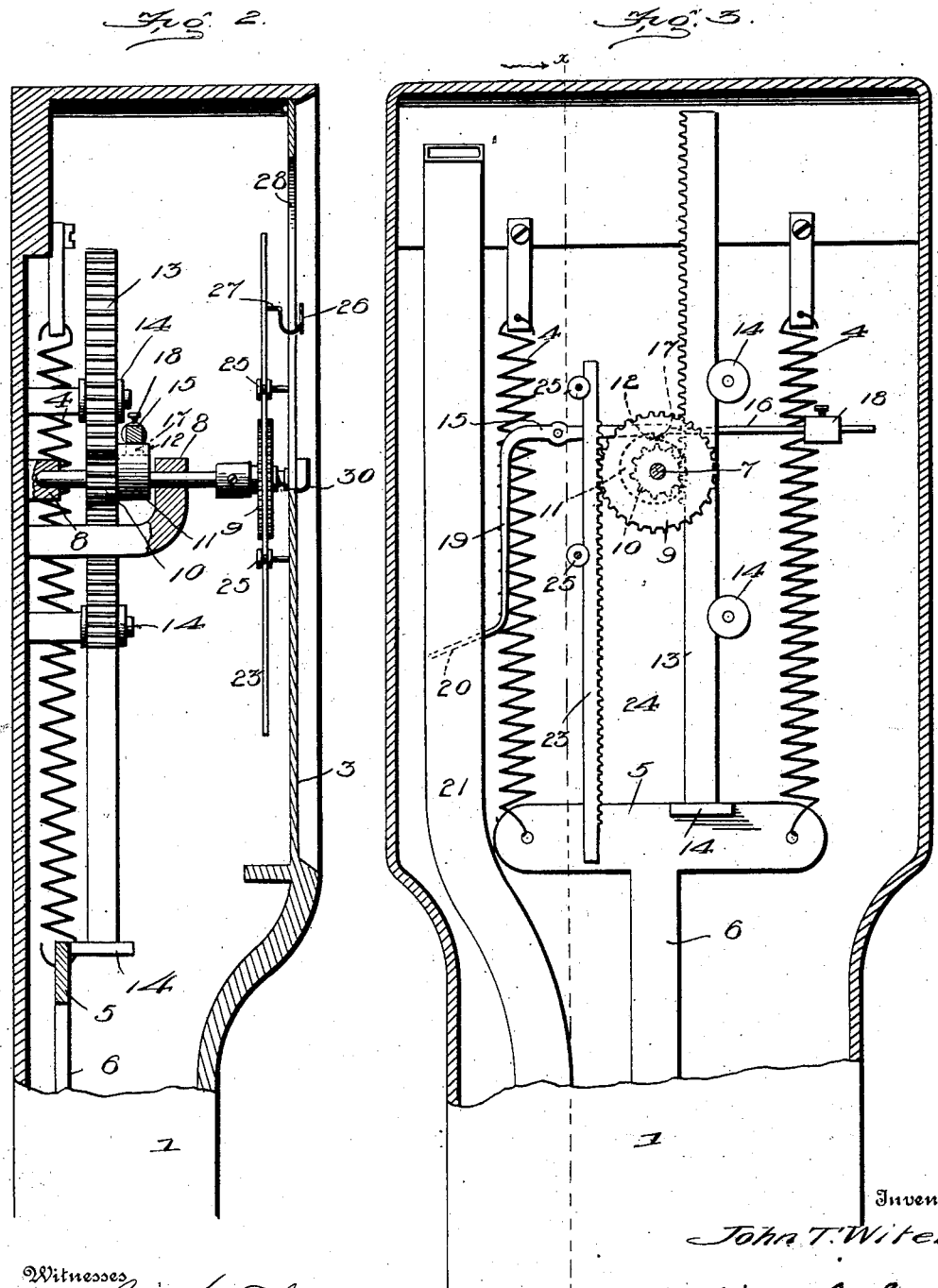
Inventor
John T. Witek,
By Victor J. Evans
Attorney
Witnesses
Chas. S. Hyer.

UNITED STATES PATENT OFFICE.

JOHN THEODORE WITEK, OF NEW YORK, N. Y.

COIN-CONTROLLED WEIGHING-MACHINE.

SPECIFICATION forming part of Letters Patent No. 724,364, dated March 31, 1903.

Application filed December 26, 1901. Serial No. 87,162. (No model.)

*To all whom it may concern:*

Be it known that I, JOHN THEODORE WITEK, a citizen of the United States, residing at 2912 Third avenue, New York city, in the county of New York and State of New York, have invented new and useful Improvements in Coin-Controlled Weighing-Machines, of which the following is a specification.

This invention relates to a coin-controlled weighing-machine; and the object of the same is to provide a simple and effective combination of elements having a contributory relationship and including means for elevating an indicator over a scale face or plate, the said indicator being in the form of an attractive object, such as a bird and normally resting in a nest, the face of the machine over which the indicator moves having applied thereto the representation of a tree or analogous support, with an object resting thereon corresponding to that serving as the indicator, and which will first attract the eye of the user of the machine and produce a pleasing effect when the moving indicator is first noticed, and thus encourage the use of the machine by exciting the curiosity of the public.

The invention consists in the construction and arrangement of the several parts, which will be more fully hereinafter described and claimed.

In the drawings, Figure 1 is a front elevation showing the face of a weighing-machine embodying the features of the invention. Fig. 2 is a transverse vertical section on the line $x$ $x$, Fig. 3, showing the indicator partially elevated. Fig. 3 is a longitudinal vertical section through the upper extremity of the machine, showing the mechanism in elevation in rear of the face-plate.

Similar numerals of reference are employed to indicate corresponding parts in the several views.

The numeral 1 designates a hollow standard rising from a suitable scale-platform (not shown) and continuing into an upper head 2 in the form of a suitable casting or other structure and to which is secured a face-plate 3. Within the head 2 are a pair of ordinary twin weight-adjusting springs 4, secured at their lower terminals to the ends of a T-head 5 on the upper extremity of a rod or bar 6, extending through and having free play within the standard and connecting with the usual springs and scale-platform levers. (Not shown.)

The various parts thus far described and as broadly stated form no part of the present invention, and it is deemed unnecessary to further illustrate the same or introduce detail description thereof, because it is proposed to introduce any well-known form of such mechanism with which the improved features hereinafter specified are adapted to be used.

The indicating mechanism comprises a pinion-shaft 7, rotatable in suitable bearings 8 and having mounted fast upon its outer portion a spur-gear 9 and on its rear portion a pinion 10, secured to and slidingly movable with a snail-cam 11, having the usual shoulder 12. A rack-bar 13 engages the pinion 10 and has its lower end in engagement with a ledge 14, extending outwardly in a horizontal plane from the upper edge of the T-head 5, the said rack-bar being movable against vertically-alined guide-rollers 14ª and by the latter held in regular and continual mesh with the said pinion. At a suitable point in relation to the spur-gear and pinion a coin-controlled lever 15 is fulcrumed and comprises a transversely-extending substantially horizontal locking-arm 16, provided with a tooth 17 and carrying an adjustable weight 18 for counterpoise purposes. Said lever also includes a depending leg 19, having a terminal foot 20, disposed at a downward angle of inclination to said leg and projected and movable in a coin-chute 21, having an inlet-slot 22, formed in the upper portion of the face-plate 3. The foot 20 is of such width as to prevent the selected coin which is designed to operate the machine from passing by the said foot, and the weight 18 will be of such dimensions as to have its resistance overcome by the coin used when the latter strikes the foot. By dropping a coin in the chute it falls with some force on the foot 20, and this force, added to the weight of the coin, causes the foot to be depressed and move inwardly in a transverse direction, thereby throwing the arm 16 upwardly and releasing the tooth 17 from the shoulder 12, with which it normally engages, and after the coin has passed the foot the weight 18 then comes into play and the arm 16 is lowered to its normal position, as shown by Fig. 3.

The spur-gear 9 is operatively engaged by a vertically-moving indicator-bar 23, having a rack 24 along one edge and held in mesh with the pinion through the medium of guide-rollers 25, arranged in vertical alinement and engaged by the edge of the said indicator-bar opposite that on which the rack is formed. The indicator-bar 23 has an indicator 26, secured thereto by an arm 27, projecting through a vertical slot 28 in the face-plate 3, and at a suitable distance from the said slot is a vertical scale plate or strip 29, along one side edge of which one reduced extremity of the indicator 26 closely moves and shows the weight of the user of the machine. When the lever 15 is tripped by the introduction of a coin within the chute 21 and the tooth 17 is disengaged from the shoulder 12 of the central cam 11, the weight of the user imposed on the platform of the scale will cause the rod or bar 6 and head 5 to depress or move downwardly, thus pulling the rack-bar 13 therewith and rotating the pinion-shaft 7 and simultaneously moving the spur-gear 9, which will cause the indicator-bar to gradually rise and similarly elevate the indicator 26, carried thereby. As soon as the weight is removed from the platform of the scale the parts resume the normal position shown by Fig. 3, ready for a subsequent actuation to indicate weight by the introduction of a coin within the chute 21.

Various objects can be used as indicators; but in the present instance a bird is employed, and at the base of the slot 28 the imitation of a nest 30 is applied on the face-plate 3, and said nest is shown as being supported by the representation of the limb 31 of a tree 32, which may be painted or otherwise applied to said face-plate. On another limb of the tree a bird 33 is represented, which is similar in all respects to that contained within the nest, and at the head of the face-plate a suitable inscription will be applied, inviting the attention of the user to the bird 33, and he will fail to notice the presence of the bird serving as the indicator until the latter rises gradually by the operation of the mechanism heretofore explained after the coin is inserted in the chute 21. The representation of a tree and other matter on the face-plate will be artistically produced, and the moving bird, at first unnoticed by the user, will create a pleasant surprise and encourage the use of the machine through curiosity and investigation as to the cause of movement of the bird, which is normally hidden within the nest, and at the same time the correct weight of each user will be indicated on the scale plate or strip 29.

Having thus described the invention, what is claimed as new is—

The combination of weighing mechanism including a rod or bar connected to the platform of the mechanism and having a T-head with vertically-disposed springs connected to the opposite extremities thereof, and a rack-bar rising from said T-head between the planes of the springs and having teeth extending partially over the inner edge thereof, a shaft carrying a pinion for engagement by the teeth of the rack-bar, and a snail-cam, a gravitating rock-arm having a tooth to engage said cam, a spur-gear on the front extremity of the said shaft, an indicator-bar held in loose engagement with the spur-gear and having teeth for operation by the latter, the said indicator-bar having its opposite terminals free and unconnected to the remaining mechanism, a face-plate having a vertical slot therein and a scale thereon, and an indicator having an arm extending through and movable in the slot and secured to the said indicator-bar.

In testimony whereof I affix my signature in presence of two witnesses.

JOHN THEODORE WITEK.

Witnesses:
L. BERINGER,
H. STAUNTIEN.